US008849470B2

(12) United States Patent
Gatti et al.

(10) Patent No.: US 8,849,470 B2
(45) Date of Patent: Sep. 30, 2014

(54) METHOD FOR PERFORMING SERVICE/MAINTENANCE ON A SWITCHGEAR PANEL, AND RELATED SWITCHGEAR PANEL

(75) Inventors: Callisto Gatti, Albino (IT); Carlo Gemme, Pavia (IT); Luciano Di Maio, Milan (IT)

(73) Assignee: ABB Technology AG, Zurich (CH)

( * ) Notice: Subject to any disclaimer, the term of this patent is extended or adjusted under 35 U.S.C. 154(b) by 341 days.

(21) Appl. No.: 13/095,430

(22) Filed: Apr. 27, 2011

(65) Prior Publication Data

US 2011/0270455 A1  Nov. 3, 2011

(30) Foreign Application Priority Data

Apr. 30, 2010  (EP) ................................. 10161653

(51) Int. Cl.
*H02B 3/00* (2006.01)
*H02B 13/035* (2006.01)

(52) U.S. Cl.
CPC .............. *H02B 13/0356* (2013.01); *H02B 3/00* (2013.01)
USPC ......................................... 700/292; 700/293

(58) Field of Classification Search
None
See application file for complete search history.

(56) References Cited

U.S. PATENT DOCUMENTS

| | | | | |
|---|---|---|---|---|
| 4,143,417 A * | 3/1979 | Wald et al. ....................... 360/55 |
| 4,870,531 A * | 9/1989 | Danek ........................... 361/93.1 |
| 5,666,256 A * | 9/1997 | Zavis et al. ..................... 361/115 |
| 6,292,717 B1 * | 9/2001 | Alexander et al. ............ 700/293 |
| 6,356,422 B1 * | 3/2002 | Bilac et al. .................... 361/93.1 |
| 7,301,742 B2 * | 11/2007 | Tignor et al. ................. 361/93.3 |
| 7,426,694 B2 * | 9/2008 | Gross et al. ..................... 715/762 |
| 7,495,574 B2 * | 2/2009 | Rocamora et al. ............ 340/638 |
| 7,859,811 B2 * | 12/2010 | Tripathi ........................ 361/93.1 |
| 8,024,492 B2 * | 9/2011 | Syed et al. ......................... 710/9 |
| 2002/0091784 A1 * | 7/2002 | Baker et al. .................... 709/208 |
| 2004/0252421 A1 * | 12/2004 | Knox et al. ....................... 361/23 |
| 2006/0193099 A1 * | 8/2006 | Schweitzer et al. .......... 361/115 |
| 2007/0138873 A1 | 6/2007 | Naumann et al. |
| 2008/0091770 A1 * | 4/2008 | Petras et al. ................... 709/203 |
| 2008/0224546 A1 * | 9/2008 | TeSelle et al. ................ 307/125 |
| 2008/0235355 A1 * | 9/2008 | Spanier et al. ................ 709/219 |
| 2009/0070051 A1 * | 3/2009 | Vetter et al. ...................... 702/57 |
| 2011/0040809 A1 * | 2/2011 | Spanier et al. ................ 707/821 |

FOREIGN PATENT DOCUMENTS

EP           2 0 68 336 A1    6/2009
WO      WO 2010/026013 A1    3/2010

OTHER PUBLICATIONS

European Search Report issued on Oct. 8, 2010, for EP App. No. 10161653.0.

* cited by examiner

*Primary Examiner* — Kavita Padmanabhan
*Assistant Examiner* — Christopher E Everett
(74) *Attorney, Agent, or Firm* — Buchanan Ingersoll & Rooney PC (57) ABSTRACT

A switchgear panel and a method for servicing/maintaining a switchgear panel are disclosed which provide a Human Machine Interface that includes a first memory unit, and a first circuit breaker on board of which an Intelligent Electronic Device is placed. The Intelligent Electronic Device having an associated memory unit. The first memory unit and/or on the associated memory unit storing sets of data related to one or more of the switchgear panel, the first Intelligent Electronic Device, and the first circuit breaker. The Human Machine Interface is in operative communication with the first Intelligent Electronic Device, to transfer and save one or more of the sets of data stored on the associated memory unit onto the first memory unit or vice versa.

16 Claims, 5 Drawing Sheets

METHOD FOR PERFORMING SERVICE/MAINTENANCE ON A SWITCHGEAR PANEL, AND RELATED SWITCHGEAR PANEL

RELATED APPLICATIONS

This application claims priority under 35 U.S.C. §119 to European Patent Application No. 10161653.0 filed in Europe on Apr. 30, 2010, the entire content of which is hereby incorporated by reference in its entirety.

FIELD

The present disclosure relates to a method for servicing/maintaining an electric switchgear panel, and to a related electrical switchgear panel.

BACKGROUND INFORMATION

As known in electrical energy distribution systems, switchgear panels are electrical components used as node points, while cables and overhead lines represent the conjunction of the various nodes.

From a structural point of view, switchgear panels, which are also known as electric switchboards, switchgears or electric panels, for example, can comprise a metallic cubicle that is internally divided into several compartments or cells housing various apparatuses and equipment. For example, one compartment houses a switching unit, such as a circuit breaker. A second compartment houses main connections, such as bus-bars, feeding power from an electrical source. A further compartment houses a system of cables suitable to be connected to a load, for example, an electrical motor.

Depending on the applications, switchgear panels can comprise other components, such as current transformers, voltage transformers, or other suitable components as desired.

Hence, according to this known scheme, a single switchgear panel or two or more associated switchgear panels can include functions for the proper distribution of electrical power. These functions have been divided into two different types; primary and secondary functions.

Primary functions are designated as those functions related to the main voltage, current and power distribution, such as, for example making, breaking, conduct the nominal current, withstanding the short circuit current for a certain time, disconnection, earthing, connections and disconnections of cables for substitution or test, isolation of live part from operators et cetera. In particular, some basic primary functions, such as breaking the current in presence of a fault, are performed by the circuit breaker.

Secondary functions are those functions related to auxiliary and control features, such as, protection, interlocking, supervision (local or remote), control (local or remote), automation, measure, metering, diagnostic, communication.

Over the years, switchgear panels have been provided more and more with electronic devices, in particular Human Machine Interfaces which interaction with users, and one or more so-called Intelligent Electronic Devices which provide existing functionalities or to add new ones, such as performing communication among components belonging to a panel or to different panels, for example.

Although these electronic devices have allowed improvements, there is still room and desire for further improvements, in particular when service or maintenance operations have to be performed.

In particular, each Intelligent Electronic Device is the storing recipient of data which can be related to the Intelligent Electronic device itself, the switchgear panel in which it is installed, as well as to a circuit breaker to which the Intelligent Electronic Device is operatively associated. If for any reason an Intelligent Electronic Device or the circuit breaker to which it is associated needs to be modified or replaced, for example, due to a possible failure, the relevant data previously stored can be lost or significantly modified. Hence, a user intervening on the switchgear panel is specified to have a computer, connection means for connecting to the Intelligent Electronic Device and also configuration data/files for correctly re-setting the switchgear panel and various components/various operation thereof. In addition, in order to accomplish this objective the user should be quite skilled in performing such operations. This qualification can negatively influence the mean time needed to perform the maintenance/servicing operations while keeping the panel out of service as well as the involved costs.

SUMMARY

A method for servicing/maintaining a switchgear panel comprising one or more compartments suitable to accommodate corresponding electrical or electronic equipment, the method comprising providing in said switchgear panel a Human Machine Interface (HMI-30) comprising a first memory unit, a first circuit breaker having a shaped body, and a first Intelligent Electronic Device which is positioned on said shaped body, wherein said first Intelligent Electronic Device comprises an associated memory unit wherein at least one of said first memory unit and associated memory unit having thereon saved sets of data related to one or more of said switchgear panel, the first Intelligent Electronic Device, and the first circuit breaker; putting said Human Machine Interface (HMI-30) in operative communication with said first Intelligent Electronic Device; transferring one or more of the sets of data saved on said associated memory unit onto said first memory unit from said first memory unit to said one or more of the sets of data saved on said associated memory HMI; and; saving the one or more sets of transferred data.

An electric switchgear panel comprising a cubicle having one or more compartments for accommodating corresponding electrical or electronic equipment, one of said compartments being devoted to receive a first circuit breaker having a shaped body and a first Intelligent Electronic Device which is positioned on board of said shaped body, said first Intelligent Electronic Device comprising an associated memory unit; and a Human Machine Interface which comprises a first memory unit and is in operative communication with the first Intelligent Electronic Device, wherein on at least one of said first memory unit and said associated memory unit there are saved sets of data related to one or more of said switchgear panel, the first Intelligent Electronic Device itself, and the first circuit breaker, and wherein at least one of said Human Machine Interface and said Intelligent Electronic Device is arranged so that one or more sets of data saved on said associated memory unit are transferred and saved onto said first memory unit.

DETAILED DESCRIPTION OF THE DRAWINGS

Further characteristics and advantages of the disclosure will emerge from the description of exemplary, but not exclusive embodiments of the method and switchgear panel according to the disclosure, non-limiting examples of which are provided in the attached drawings, wherein.

DETAILED DESCRIPTION

It is therefore an object of the present disclosure to provide a solution which allows overcoming the above mentioned shortcomings.

This object is achieved by a method for servicing/maintaining a switchgear panel comprising one or more compartments suitable to accommodate corresponding electrical or electronic equipment. The method comprises providing in said switchgear panel a Human Machine Interface (HMI) having a first memory unit, a first circuit breaker having a shaped body, and a first Intelligent Electronic Device (IED) which is positioned on board of said shaped body. The first Intelligent Electronic Device (IED) includes an associated memory unit, on at least one of the first memory unit and associated memory unit there being saved sets of data related to one or more of the switchgear panel, the first Intelligent Electronic Device itself, and the first circuit breaker. Other steps include putting the Human Machine Interface in operative communication with the first Intelligent Electronic Device, transferring one or more of the sets of data saved on the associated memory unit onto the first memory unit or vice versa, and saving the one or more sets of data transferred.

This object is also achieved by an electric switchgear panel that comprise a cubicle having one or more compartments suitable to accommodate corresponding electrical or electronic equipment. One of the compartments is devoted to receive a first circuit breaker having a shaped body and a first Intelligent Electronic Device which is positioned on board of the shaped body. The first Intelligent Electronic Device having an associated memory unit, and a Human Machine Interface. The Human Machine Interface includes a first memory unit and is in operative communication with the first Intelligent Electronic Device, wherein on at least one of the first memory unit and the associated memory unit there are saved sets of data related to one or more of the switchgear panel, the first Intelligent Electronic Device itself, and the first circuit breaker. At least one of the Human Machine Interface and the Intelligent Electronic Device is arranged so that one or more sets of data saved on said associated memory unit are transferred and saved onto said first memory unit and/or vice versa.

Figure 1:
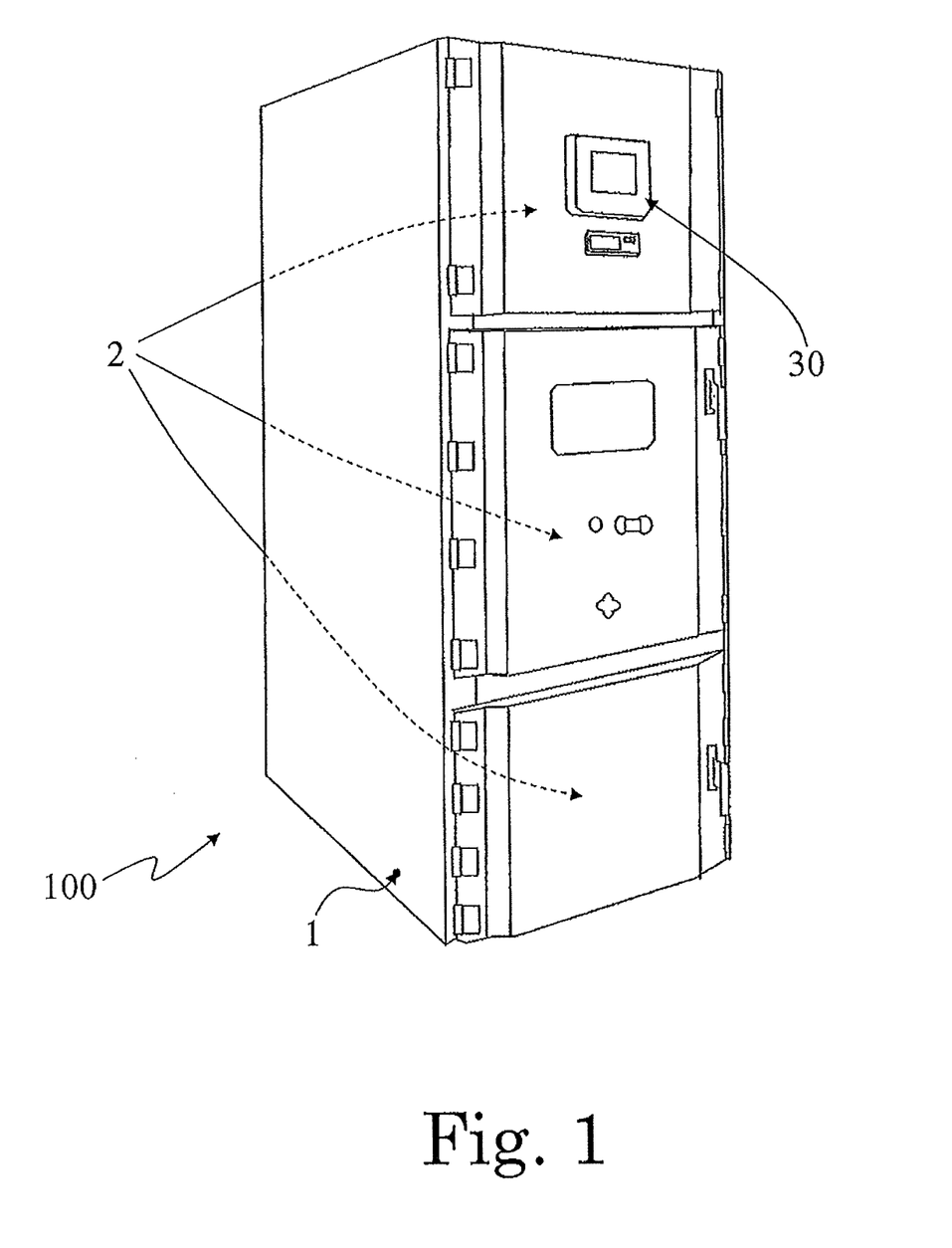
FIG. 1 is a perspective view illustrating an electric switchgear panel in accordance with an exemplary embodiment.

FIG. 1 is a perspective view illustrating an electric switchgear panel in accordance with an exemplary embodiment. FIG. 1 shows an example of an electric switchgear panel according to the present disclosure; that comprises, a cubicle or cabinet 1 having a plurality of walls which together define an inside volume. The inside volume of the cabinet 1 can be divided into one or more compartments 2 suitable for accommodating various electrical or electronic equipment and/or devices.

Figure 2:
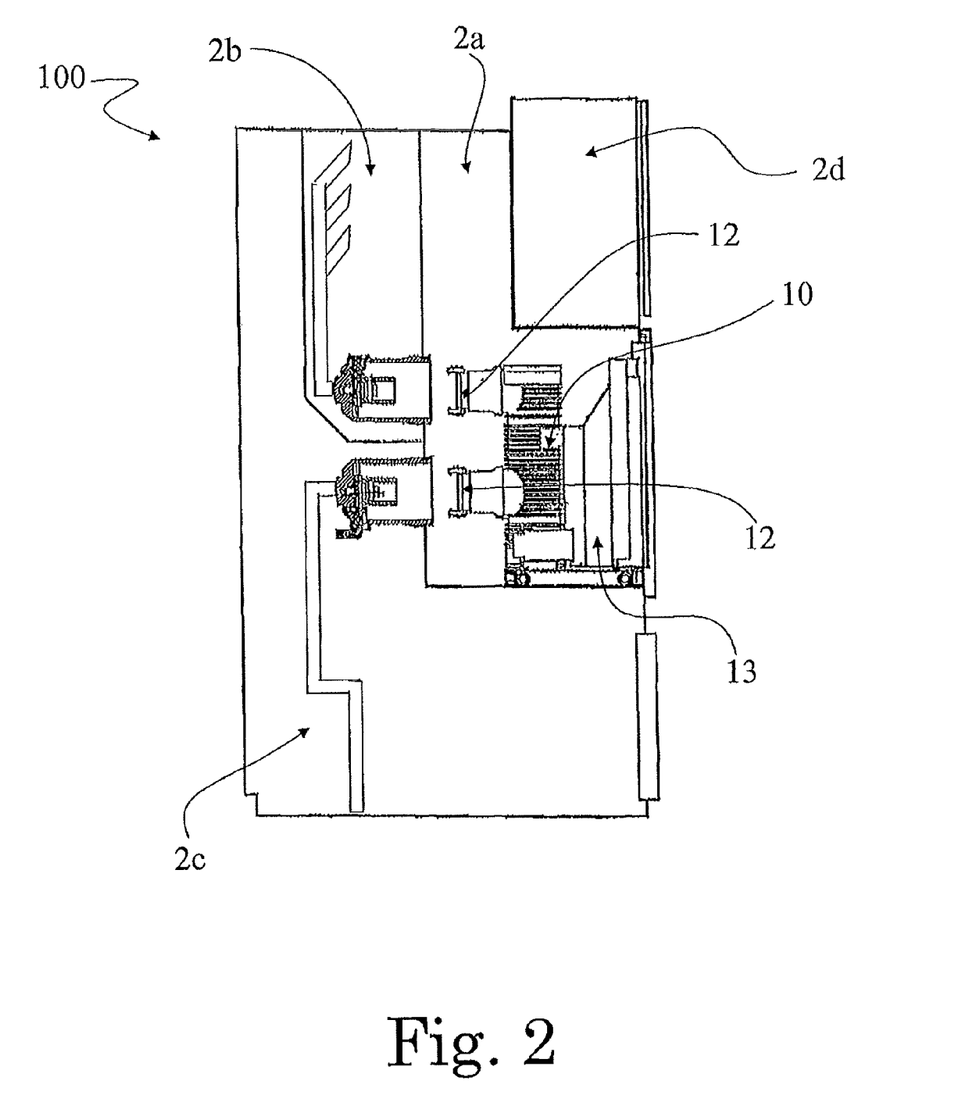
FIG. 2 is a side view schematically illustrating an electric switchgear panel in accordance with an exemplary embodiment.

FIG. 2 is a side view schematically illustrating an electric switchgear panel in accordance with an exemplary embodiment. In the exemplary embodiment illustrated in FIG. 2 there are for instance three compartments, e.g. a first compartment 2a for housing a circuit breaker 10, a second compartment 2b for housing a bus-bar system, a third compartment 2c for housing connecting cables, a fourth compartment 2d for housing other components, such as control electronics. It should be understood that the number of compartments and related apparatuses, components and devices housed therein can vary according to the specific applications, as desired.

Figure 3:
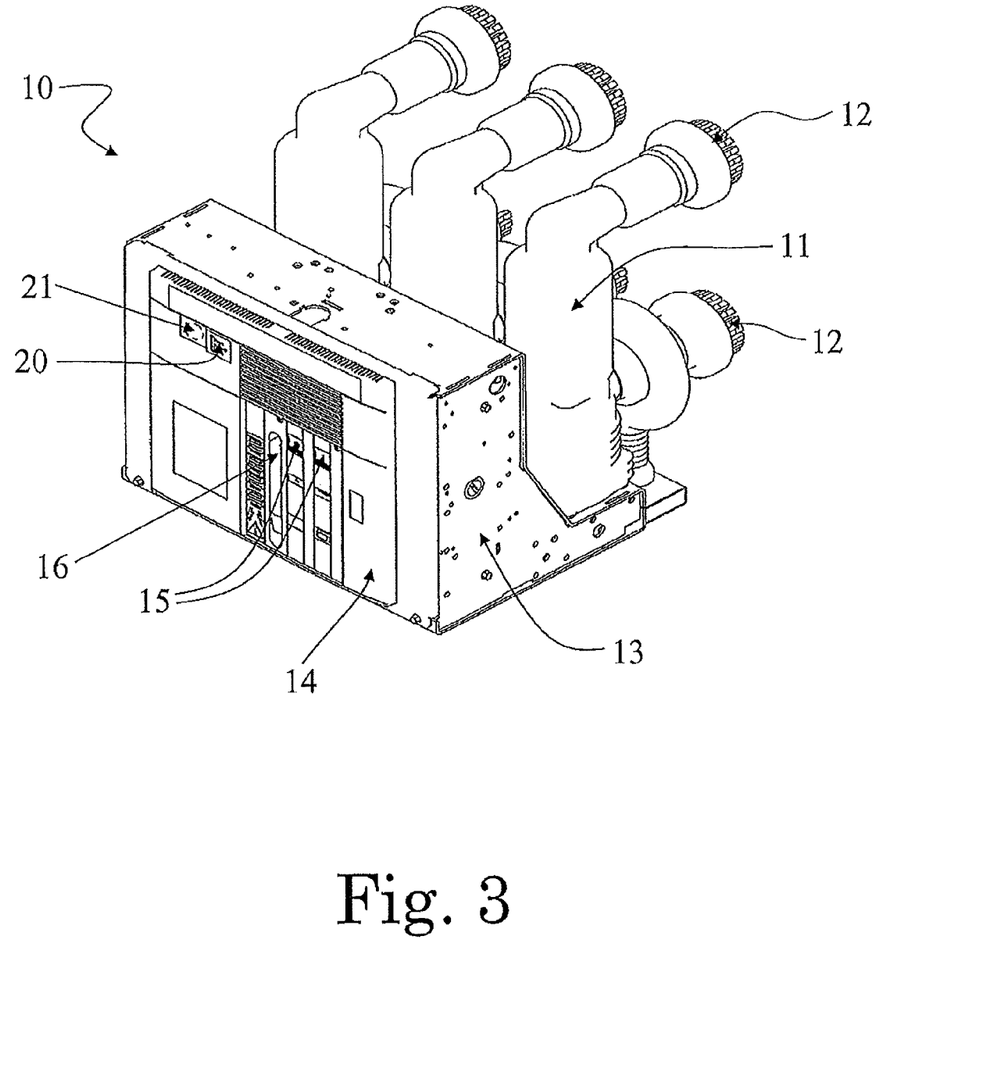
FIG. 3 is a perspective view illustrating a circuit breaker used in the electric switchgear panel and in accordance with an exemplary embodiment.

FIG. 3 is a perspective view illustrating a circuit breaker used in the electric switchgear panel and in accordance with an exemplary embodiment The first circuit breaker 10 comprises a shaped body and, in the exemplary embodiment illustrated in FIG. 3, can be a three-phase vacuum circuit breaker. According to solutions well known in the art and therefore not described herein in details, the illustrated circuit breaker 10 can include for each phase, a vacuum bottle which is embodied into a cast-resin envelope 11 and contains a fixed contact and a corresponding movable contact for opening/closing the electric circuit inside which the switchgear panel 100 is inserted. Each phase can include two sets of contacts 12 for input/output connections with the associated electric circuit. The exemplary circuit breaker 10 illustrated in FIG. 3 comprises a front part or compartment 13 which houses the driving mechanism (e.g. levers, springs, etc.) for actuating the movable contact of each phase, as well as other components such as electronic circuitry. The front face 14 features also other elements such as buttons 15, a manual opening lever 16, for example.

As it will be appreciated by those skilled in the art, the illustrated circuit breaker 10 has to be understood as a non-limiting exemplary embodiment since any current switching device, e.g. any circuit breaker or contactor, with mechanical, electromagnetic or other actuating mechanisms as desired, can be suitable for use in the application exemplary embodiments of the present disclosure. For example, circuit breaker types, such as, "eVD4" or "eVM1" marketed by ABB® group, for example, can be used.

Figure 5:
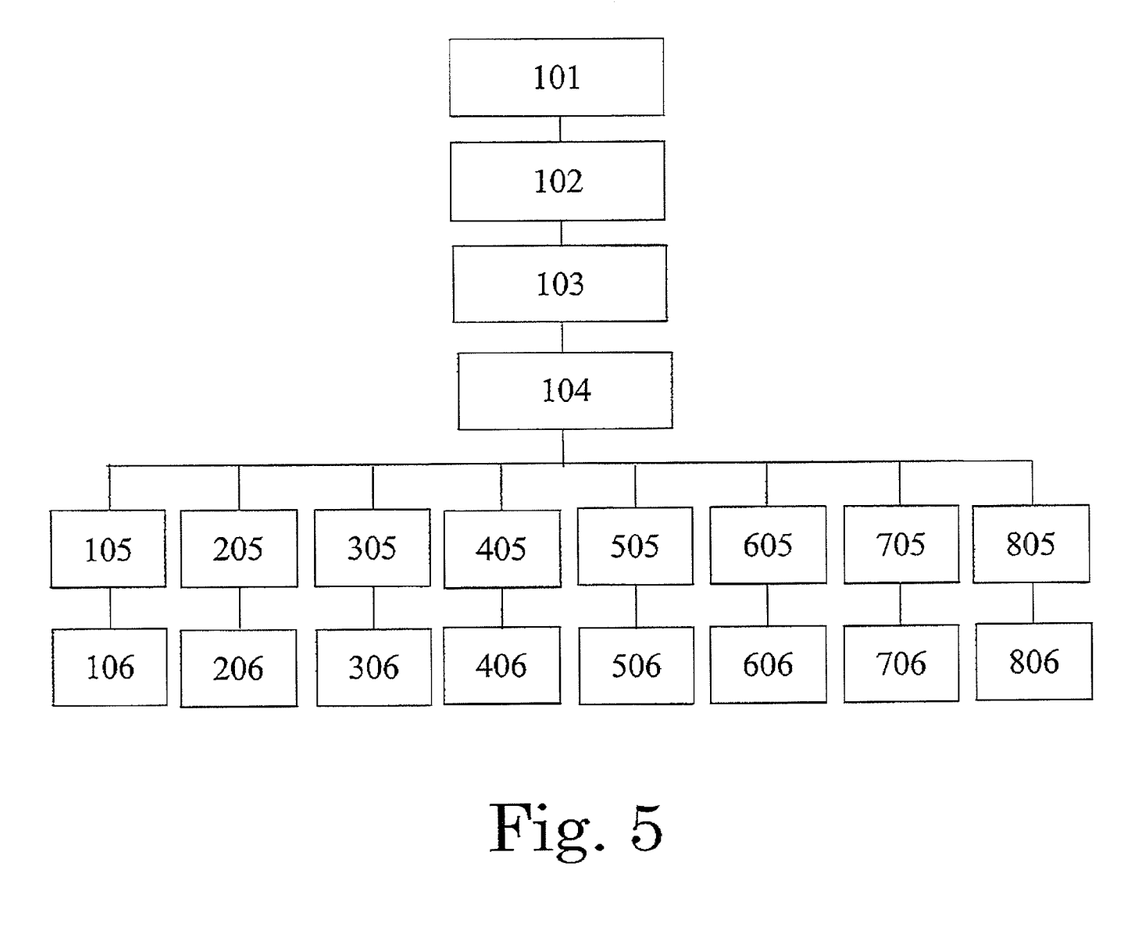
FIG. 5 is a flow diagram of a method for servicing/maintaining an electric switchgear in accordance with an exemplary embodiment.

FIG. 5 is a flow diagram of a method for servicing/maintaining an electric switchgear in accordance with an exemplary embodiment. At a first step 101 of the method according to the disclosure, inside one compartment 2a of the switchgear panel 100 there is provided a first circuit breaker 10. In step 101, a first Intelligent Electronic Device 20 (hereinafter referred to as "IED 20") can be positioned, for example, directly on board (e.g., on a surface) of the shaped body of the circuit breaker 10. The body of the circuit breaker comprising the circuit breaker 10 and related IED 20 which can be provided as a unique pre-assembled component.

As provided in the present disclosure, an IED 20 is a microprocessor-based electronic device, such as an electronic relay, which performs one or more various functions including, but not limited to, protection, monitoring, control of the associated circuit breaker and/or part or the whole panel. It can also act as a concentrating point of all information related to the panel 100 and coming from its different parts. The IED can comprise one or more of, a control unit, a I/O functional block, a communication functional block, a dedicated Human Machine Interface, a power supply block, and a switching device power drive block, as desired.

Possible examples of IEDs which can be used in the method and switchgear panel 100 according to the present disclosure are models such as, "RBX615", or "REF601", for example, marketed by ABB® group.

In particular, the IED 20 of the present disclosure can comprise an associated memory unit, as is schematically represented in FIG. 3 by dotted lines and indicated by the reference number 21. The associated memory unit 21 can record saved sets of data related to at least one or more of the switchgear panel 100, the first IED 20 itself, and the first circuit breaker 10 directly on board of which the IED 20 is installed.

The data can include, for example, but not limited to: configuration data relevant to the switchgear panel application, e.g., BI/O ("Binary Input/Output") circuits that establish an interface by wiring the IED to the circuit breaker 10 and the panel 100, logics programming the IED and circuit breaker operation depending on BI/o status, type and number of protections installed, protection settings, which are independent from the specific circuit breaker 10 used. configuration data related to circuit breaker production, e.g. pole type, sensor type, rated current and calibration data, circuit breaker serial number; operational data related to the circuit breaker use, for instance the number of operations executed during actual life, event list, diagnostic data such as sum of interrupted currents; data specific for the IED 20, for example serial IED number, firmware versions, or other suitable data as desired.

Such data may be stored in one single file or a plurality of different files.

Figure 4:
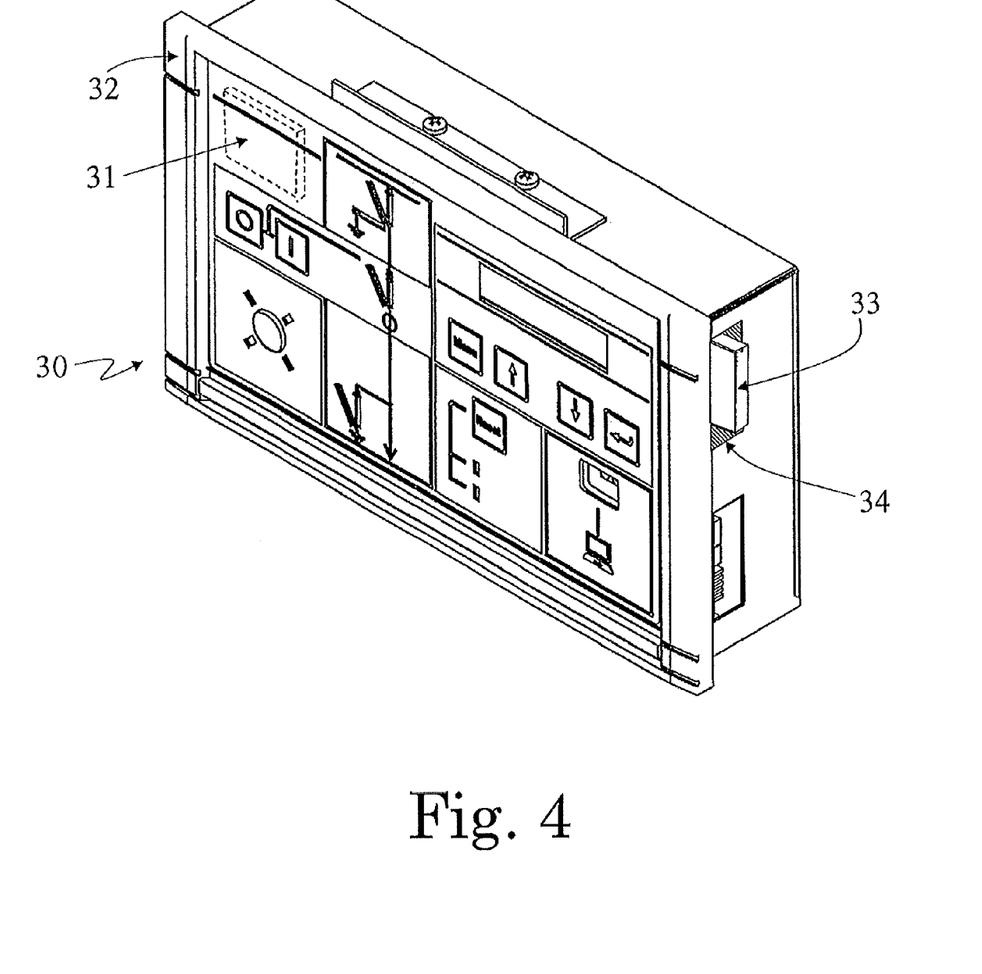
FIG. 4 is a perspective view illustrating a Human Machine Interface which can be utilized in the electric switchgear panel in accordance with an exemplary embodiment.

In addition, at step 101 there is also provided a Human Machine Interface 30 (hereinafter referred to as "HMI 30"). FIG. 4 is a perspective view illustrating a Human Machine Interface which can be utilized in the electric switchgear panel in accordance with an exemplary embodiment. The HMI 30 according to the present disclosure comprises a first memory unit schematically represented in FIG. 4 by dotted lines and indicated by the reference number 31. On the first memory unit 31 there may be also saved sets of data, such as some of or all the data above described and/or different ones.

As shown in FIG. 4, the HMI 30 comprises a front face 32 provided with various elements, e.g. menu-navigating buttons, displays, or other elements as desired, for allowing proper interaction with a user when the switchgear panel 100 is placed in operations.

It should be understood that the HMI 30 of FIG. 4 is an exemplary Human Machine Interface suitable and arranged for the application can be used. For example, the HMI can be implemented as an "eVD4HMI", or "REF542plus HMI", for example, which is marketed by ABB® group.

Within the same step 101, the HMI 30 and the first circuit breaker 10 with its associated IED 20 can be provided in the switchgear panel 100 in whichever order with respect to each other.

At step 102 of FIG. 5, the HMI 30 is put in operative communication with the first IED 20.

At least one of the HMI 30 and the IED 20, can be arranged so as: at a following step 103, one or more of the sets of data saved on the memory unit 21 associated to the IED 20 can be transferred (step 103) and saved (step 104) onto the first memory unit 31 or vice versa.

During normal functioning of the switchgear panel 100 relevant data can be continuously transferred and saved from the memory unit 21 associated to the IED 20 onto the first memory 31 of the HMI 30. In this way, the data saved on the first memory 31 and/or even those saved onto the associated memory 21 can be continuously and automatically updated.

In an exemplary embodiment data can be transferred and saved when desired, e.g. when a user interacts with the HMI 30 (or the IED 20) and desires to perform such operation.

In another exemplary embodiment it can be possible to transfer and save data from the memory 31 of the HMI 30 onto the memory unit 21 of the IED 20 (or vice versa), when operations are started or during normal functioning, either continuously or when desired.

In the exemplary method and related switchgear panel 100 according to the present disclosure, an additional memory unit 33 can be associated with the HMI 30, e.g. by entering it into a suitable slot 34 provided on the body of the HMI 30 itself. A back-up copy of the sets of data can be saved on the first memory unit 31 (and/or even those saved on the associated memory unit 21) and transferred and saved onto the additional memory unit 33. Further, the HMI 30 can be also configured so that one or more of sets of data, possibly saved onto the additional memory 33, can be transferred onto the first memory 31.

The additional memory unit 33 can be releasably mounted onto the HMI 30. Such an additional memory unit 33 can be mounted on the HMI 30 before placing the HMI 30 itself inside the panel 100, or once the HMI 30 is installed and prior to the switchgear panel 100 is starting initiating operations, or even at a later time when the switchgear panel 100 is already operating, and can be easily removed when desired, as a memory card.

During the operating life of the switchgear panel 100, maintenance of the circuit breaker 10 used therein can be performed. Here, the circuit breaker 10 can be extracted from the panel 100 (together with the IED 20 mounted on board of it) and properly serviced. During maintenance some of the data previously saved on the associated memory unit 21, for example, those related to the number of operations executed, may change.

Hence in the exemplary method and switchgear panel 100 according to the present disclosure, at least one of the HMI 30 and the first IED 20, and the HMI 30 alone, can be arranged so that, after performing the specified maintenance of the first circuit breaker 10 and again installing it inside the panel 100 with the IED 20 in operative communication with the HMI 30, it is possible to check, if there are data differing between the sets of data saved on the memory unit 21 associated to the IED 20 and the corresponding sets of data saved on the first memory unit 31 (step 105). If this is the case, the HMI 30 can be arranged so that a user by intervening can transfer, at least part of the differing data (step 106). In particular, it can be possible to transfer and thereafter save the different data from the first memory unit 21 onto the associated memory 31, or vice versa, or both, for example, some differing data residing on the first memory unit 21 can be transferred onto the memory unit 31, while some other differing data residing on the memory unit 31 can be transferred and saved onto the first memory unit 21.

In an exemplary embodiment, such transferring and saving of data could be also performed automatically by the HMI 30. Alternatively, transferring and saving could be performed by the IED 20, automatically or by intervention of a user on it, or even by using in combination the HMI 30 and the IED 20.

During the working life of the switchgear panel 100 at least one of the existing first circuit breaker 10, the first IED 20, the associated memory unit 21, the HMI 30, or the first memory unit 31, can be replaced with a corresponding new circuit breaker 10, new IED 20, new associated memory unit 21, new HMI 30, or new first memory unit 31, respectively. As a result, some of the data previously saved on the associated memory unit 21 or on the first memory unit 31, may totally or partially change or be invalid.

In this case, once the replacement has occurred, it is possible through at least one of the HMI 30 and the IED 20 actually used in the panel 100 to check if differing data exists between the sets of data saved on the actually used associated memory unit 21 with the sets of data saved on the actually used first memory unit 31. If the data differs, then transferring at least part of the differing data from the actually used first memory unit 31 onto the actually used associated memory unit 21 or vice versa, can be allowed.

Such operations can be performed automatically through the HMI 30 or through the interaction of a user with the HMI 30. In an exemplary embodiment transferring and saving could be performed by the IED 20, automatically or by intervention of a user on it, or even by using in combination the HMI 30 and the IED 20.

For example, if an existing circuit breaker 10 needs to be replaced, due to a mechanical failure, for example, a user can replace only the existing circuit breaker 10 with a new circuit breaker 10 having a shaped body. The circuit breaker can be installed directly on board if the existing first IED 20 with its associated memory unit 21 which was used in connection with the previous circuit breaker 10. As a result, some of the data previously saved on the associated memory unit 21 or on the first memory unit 31, for example those related to the circuit breaker itself e.g. pole type, serial number, or the number of maneuvers executed, can totally or partially change or be invalid. For example, new data relevant to the new circuit breaker 10 can be stored on the first memory 21 by using the IED 20 itself.

In the exemplary switchgear panel 100 and method according to the present disclosure, at least one of the HMI 30 and the first IED 20, or the HMI 30 alone, can be arranged so that, once the new circuit breaker 10 with the related first IED 20-associated memory unit 21 is positioned into the panel 100 and is put in communication with the HMI 30, it can be possible to check, if there are differing data between the sets of data saved on the memory unit 21 of the IED 20 and the corresponding sets of data saved on the first memory unit 31 of the HMI 30 (step 205). If this is the case, at step 206, a user through the HMI 30 or the IED 20, can transfer, at least part of the differing data. As previously described, it can be possible to transfer and thereafter save the different data from the first memory unit 21 onto the associated memory 31, or vice versa, or both, e.g., some differing data residing on the first memory unit 21 can be transferred and saved onto the memory unit 31, while some other differing data residing on the memory unit 31 are transferred and saved onto the first memory unit 21.

In an exemplary embodiment the transferring and saving of data can be performed automatically by the HMI 30 alone, by the IED 20 alone automatically or through the intervention of a user on it, or in a combination of the HMI 30 and the IED 20.

In another exemplary embodiment, during the working life of the switchgear panel 100 it can be necessary for any reason to replace the memory unit 21 associated with the IED used in the panel 100 itself, or the first memory unit 31 associated with the HMI 30 used.

In the first case, the memory unit 21 associated with the IED 20 can be replaced with a new memory unit (hereinafter indicated as a second associated memory unit 21) and the IED 20 can be operatively connected with the HMI 30. At step 305, for the HMI 30 can be adapted to allow checking if there are differing data between the sets of data saved on the first memory unit 31 and sets of data, if any, stored on the second associated memory unit 21. At step 306, a user through the HMI 30 can decide, transfer and thereafter saved at least part of the differing data from the first memory unit 31 onto the second associated memory unit 21 or vice versa or even both.

In another exemplary embodiment, such transferring and saving of data can be performed automatically by the HMI 30 alone, by the IED 20 alone automatically or through the intervention of a user on it, or in combination by the HMI 30 and the IED 20.

In the second situation, after the first memory unit 31 associated with the HMI 30 is replaced with a new memory unit (hereinafter indicated as a second memory unit 31), the HMI 30 can be adapted to allow, checking if there are differing data between the sets of data saved on the associated memory unit 21 associated to the IED 20 and sets of data, if any, stored on the second memory unit 31 (step 405). Then at step 406, a user through the HMI can decide, transfer, and thereafter save at least part of the differing data from the associated memory unit 21 to the second memory unit 31 or vice versa, or even both.

Also in this case, transferring and saving data can be performed automatically by the HMI 30 alone, by the IED 20 alone automatically or through the intervention of a user on it, or in combination by the HMI 30 and the IED 20.

It can also be the case that the IED 20 resident in the panel 100 and its associated memory unit 21 are replaced all together at the same time. In this example, a user can replace the existing first IED 20 and its associated memory unit 21 with a new IED 20 comprising a new associated memory unit 21. The new associated memory unit 21 can include saved sets of data, for example, data related to the new IED 20 used. After positioning the new IED 20 with its new memory 21 on board of the existing circuit breaker and putting it into operative communication with the HMI 30, the HMI 30 can be adapted to allow, checking if there are differing data between the sets of data saved on the new associated memory unit 21 and the sets of data saved on the first memory unit 31 (step 505). If this the case, then at step 506, a user through the HMI 30 can decide, transfer and thereafter save at least part of the differing data from the first memory unit 31 to the new associated memory unit 21, or vice versa, or even both.

In another exemplary embodiment, the transferring and saving of data can be performed automatically by the HMI 30 alone, by the new IED 20 alone automatically or through the intervention of a user on it, or in combination by the HMI 30 and the IED 20.

In an exemplary embodiment, the first circuit breaker 10 and the first IED 20 with its associated memory 21 positioned on board of the circuit breaker itself can be replaced all together with corresponding new circuit breaker 10, new IED 20, and associated new memory unit 21.

In this situation, the existing elements such as, circuit breaker 10-IED 20 with its associated memory unit 21, for example, can be replaced with a corresponding new circuit breaker 10 that includes a new first IED 20 with its new associated memory unit 21. The new associated memory unit 21 can include saved sets of data, for example, data related to the new IED 20 and the new circuit breaker 10 under installation. After positioning the new circuit breaker 10-new IED 20 with its memory 21 inside the panel 100, and putting them into operative communication with the existing HMI 30, the HMI can be adapted to allow, checking if there are differing data between the sets of data saved on the new associated memory unit 21, if any, and the sets of data saved on the first memory unit 31 (step 605). If this the case, then at step 606, a user through the HMI 30 can decide, transfer, and thereafter save at least part of the differing data from the first memory unit 31 to the new associated memory unit 21, or vice versa, or even both.

The transferring and saving of data can also be performed automatically by the existing HMI 30 alone, by the new first IED 20 alone automatically or through the intervention of a user on it, or in combination by the HMI 30 and the IED 20.

The HMI 30 altogether with its first memory unit 31 can be replaced with a new HMI 30 comprising a new first memory unit 31.

In this exemplary embodiment, at step 705, the new HMI 30 can check if there are differing data between the sets of data saved on the associated memory unit 21 and sets of data saved on the new first memory unit 31. If this is the case, at step 706, at least part of the differing data are transferred from the new first memory unit 31 to the associated memory unit 21 or vice versa a user interacting on the new HMI 30.

Also in this exemplary embodiment, such transferring and saving of data can also be performed automatically by the new HMI 30 alone, or by the existing first IED 20 alone automatically or through the intervention of a user on it, or in combination by the new HMI 30 and the existing IED 20.

Finally, it can be possible that only the first IED 20 or only the HMI 30 can be replaced. In both cases, once the replacement has occurred, and the new IED 20 (or new HMI 30) is put in operative communication with the existing HMI 30 (or existing IED 20), the HMI 30 under use can be arranged to check, if there are differing data between the sets of data saved on the memory unit 21 of the IED 20 and the corresponding sets of data saved on the first memory unit 31 of the HMI 30 (step 805). If this is the case, at step 806, the HMI 30 can transfer (automatically or by intervention of a user on it), at least part of the differing data. As previously described, it can be possible to transfer and thereafter save, the different data from the first memory unit 21 onto the associated memory 31, or vice versa, or both. For example, some differing data residing on the first memory unit 21 are transferred and saved onto the memory unit 31, while some other differing data residing on the memory unit 31 are transferred and saved onto the first memory unit 21.

Such transferring and saving of data can also be performed by the IED 20 alone automatically or through the intervention of a user on it, or in combination by the HMI 30 and the IED 20.

In the above exemplary embodiments, when it is necessary to replace the existing HMI 30 (or existing IED 20), the new HMI 30 (or the new IED 20) used should be functionally equivalent and otherwise be able to perform all the same functionalities described for the replaced HMI 30 (or replaced IED 20) and needed for the scope of the present disclosure.

It should be evident from the above that the method and switchgear panel 100 according to the present disclosure allow to fully achieve the intended object by providing flexible solution which leads to advantages over the known prior art a very flexible solution. Indeed, when any component among those above described of the switchgear panel 100 undergoes any modification (e.g. after maintenance of the circuit breaker) or is replaced and/or the panel 100 is serviced, the HMI or in the alternative the IED or combination with the IED can be arranged, e.g. through suitable software routines, to verify the identity of what is operatively connected therewith and can find different situations. For example, when the same circuit breaker that was previously housed has been inserted again after maintenance, and therefore no data are changed or just data related to the number of operations executed are changed. Or when a different circuit breaker and/or IED and/or related memory unit 21 has been inserted, e.g., it has an history on board different from the data available on the memory 31 of the HMI 30. Hence, any of the relevant data sets is changed, e.g. the IED has been replaced and therefore production data sets related to the new IED are different, but all other data are still true and correspond to those saved on the memory 31; or the existing IED has been swapped to a spare circuit breaker since the failure was in the mechanical part of the existing circuit breaker and therefore data related to the configuration of the switchgear panel 100 and the IED 20 still correspond to those saved on the memory unit 31, while production data related to the new circuit breaker and operational data related to the previous circuit breaker are changed and shall be relevant to the new circuit breaker.

The different cases can be managed in a very simple way, such as by asking the user via the HMI if the data sets are different and which shall prevail, e.g., if the ones residing on the memory unit 31 of the HMI 30 which therefore should be downloaded to the memory unit 21 of the IED 20, or the other way around, or even both ways, therefore avoiding need of using a portable computer with needed configuration SW programs and configurations files and needed user expertise to undergo the said servicing operations.

Alternatively on in addition, the IED 20 can be arranged, i.e. provided with similar software routines, so as to allow the same operations either by intervention of a user on it or automatically.

In addition, the use of the additional memory unit 33 which is removably connected to the HMI 30 can enable an easy porting of configurations from one panel 100 to another. The additional memory 33 can also allow for example, if there is a failure of the existing HMI 30, to replace it with an identical one, and downloading the back-up data saved directly from the memory 33 onto the memory 31 of the new HMI 30.

Such a process can enable the copying of configurations from one panel to others via the HMI, for instance configuration data relevant to the switchgear panel application, logics programming the IED and circuit breaker operation depending on BI/o status, type and number of protections installed, protection settings, et cetera, which are independent from the specific circuit breaker 10 used.

The method and electric switchgear panel 100 thus conceived may undergo numerous modifications and come in several variants, all falling within the scope of the inventive concept as defined by the appended claims. The component materials and dimensions of the switchgear can be of any type, according to needs and the state of the art.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for servicing or maintaining a switchgear panel comprising one or more compartments suitable to accommodate corresponding electrical or electronic equipment, said equipment including a Human Machine Interface (HMI) having an associated HMI memory unit, a circuit breaker having a shaped body and an Intelligent Electronic Device (IED) positioned on said shaped body and having an associated IED memory unit, wherein at least one of said HMI memory unit and said IED memory unit having thereon saved sets of data related to at least one of said switchgear panel and said equipment within said switchgear panel, and wherein said Human Machine Interface is in operative communication with said Intelligent Electronic Device, the method comprising:

repairing said circuit breaker such that data stored in the IED memory unit changes; and in the HMI or IED:

comparing data sets stored in the IED memory unit with data sets stored in the HMI memory unit;

identifying differences between the compared data sets; and transferring at least a portion of first differing data from the IED memory unit to the HMI memory unit, and at least a portion of second differing data from the HMI memory unit to the IED memory unit to maintain at least a functionality of the switchgear panel corresponding to pre-equipment repair.

2. The method according to claim 1 comprising:

after repairing the circuit breaker checking through at least one of the Human Machine Interface and the Intelligent Electronic Device to determine if there are data differing between the sets of data saved on said IED memory unit and the sets of data saved on said HMI memory unit; and transferring through at least one of the Human Machine Interface and the first Intelligent Electronic Device at least part of the first and second differing data between said HMI memory unit and said IED memory.

3. A method for servicing or maintaining a switchgear panel comprising one or more compartments suitable to accommodate corresponding electrical or electronic equipment, said equipment including a Human Machine Interface (HMI) having an associated HMI memory unit, a circuit breaker having a shaped body and an Intelligent Electronic Device (IED) positioned on said shaped body and having an associated IED memory unit, wherein at least one of said HMI memory unit and said IED memory unit having thereon saved sets of data related to at least one of said switchgear panel and said equipment within said switchgear panel, and wherein said Human Machine Interface is in operative communication with said Intelligent Electronic Device, the method comprising:

replacing at least one existing piece of equipment including said HMI, HMI memory unit, IED, IED memory unit, and circuit breaker with an equivalent device;

wherein the equivalent device is placed in communication with the HMI or IED, which is configured to perform the steps of:

comparing data sets stored in association with the equivalent device with data sets stored in the associated HMI memory unit or IED memory unit;

identifying differences between the compared data sets; and transferring at least a portion of first differing data associated with the equivalent device to the associated HMI memory unit or IED memory unit, and at least a portion of second differing data from the associated HMI memory unit or IED memory unit to the equivalent device to maintain at least a functionality of the switchgear panel corresponding to pre-equipment replacement.

4. The method according to claim 3, wherein said circuit breaker is a first circuit breaker, and further comprising:

after replacing at least said first circuit breaker with a new circuit breaker having a shaped body, and positioning said Intelligent Electronic Device with said IED memory unit on board of said shaped body of the new circuit breaker;

checking through at least one of the Human Machine Interface and the Intelligent Electronic Device if there are differing data between the sets of data saved on said IED memory unit and the sets of data saved on said HMI memory unit; and transferring through at least one of the Human Machine Interface or the Intelligent Electronic Device at least part of the first and second differing data between said HMI memory unit to and said IED memory unit.

5. The method according to claim 3, wherein said Intelligent Electronic Device is a first Intelligent Electronic Device and said IED memory unit is a first IED memory unit and wherein after replacing said first Intelligent Electronic Device and first IED memory unit with a new Intelligent Electronic Device that includes a new IED memory unit, positioning said new Intelligent Electronic Device on board of said shaped body of the circuit breaker, the method further comprises:

checking through at least one of the Human Machine Interface and the new Intelligent Electronic Device to determine if there are differing data between the sets of data saved on said new IED memory unit and sets of data saved on said HMI memory unit; and transferring through at least one of the Human Machine Interface and the new Intelligent Electronic Device at least part of the first and second differing data between said HMI memory unit and said new IED memory unit.

6. The method according to claim 3, wherein said circuit breaker is a first circuit breaker, said Intelligent Electronic Device is a first Intelligent Electronic Device, and said IED memory unit is a first IED memory unit and wherein, after replacing in said switchgear panel said first circuit breaker and said first Intelligent Electronic Device having said first IED memory unit with a new circuit breaker having a shaped body and a new Intelligent Electronic Device which is positioned on board of said shaped body of the new circuit breaker and comprises a new associated memory unit the method further comprising:

checking through at least one of the Human Machine Interface and the new Intelligent Electronic Device to determine if there are differing data between the sets of data saved on said new IED memory unit and the sets of data saved on said HMI memory unit; and transferring through at least one of the Human Machine Interface and the new Intelligent Electronic Device at least part of the first and second differing data between said HMI memory unit and said new IED memory unit.

7. The method according to claim 3, wherein said Human Machine Interface is a current Human Machine Interface wherein after replacing at least said current Human Machine Interface with a new Human Machine Interface, checking through at least one of the new Human Machine Interface and the Intelligent Electronic Device to determine if there are differing data between the sets of data saved on said IED memory unit and the sets of data saved on said HMI memory unit the method comprises:

transferring through at least one of the new Human Machine Interface and the Intelligent Electronic Device at least part of the first and second differing data between said IED memory unit and said HMI memory unit.

8. The method according to claim 3, wherein said Human Machine Interface is a current Human Machine Interface and said HMI memory unit is a first HMI memory unit wherein after replacing said current Human Machine Interface including said first HMI memory unit with a new Human Machine Interface comprising a new HMI memory unit the method comprises:

checking through at least one of the new Human Machine Interface and the Intelligent Electronic Device to determine if there are differing data between the sets of data saved on said IED memory unit and sets of data saved on said new HMI memory unit; and transferring through at least one of the new Human Machine Interface and the Intelligent Electronic Device at least part of the first and second differing data between said new HMI memory unit and said IED memory unit.

9. The method according to claim 3, further comprising:
mounting on said Human Machine Interface, an additional removable memory unit; and at least one of:
saving on said additional memory unit a back-up copy of the sets of data saved on said HMI memory unit; and
saving on said HMI memory unit a copy of the sets of data saved on said additional removable memory.

10. The method according to claim 3, wherein said IED memory unit is a first IED memory unit, and after replacing said first IED memory unit associated with of said Intelligent Electronic Device with a second IED memory unit, checking to determine if there are differing data between the sets of data saved on said HMI memory unit and sets of data stored on said second IED memory unit, and transferring at least part of the differing data from said HMI memory unit to said second IED memory unit; or
after replacing said first IED memory unit with said second IED memory unit, checking to determine if there are differing data between the sets of data saved on said first IED memory unit and sets of data stored on said second IED memory unit, and transferring at least part of the first and second differing data between said first IED memory unit and said second IED memory unit.

11. An electric switchgear panel comprising:
a cubicle having one or more compartments for accommodating corresponding electrical or electronic equipment;
a circuit breaker disposed in one of said compartments, said circuit breaker having a shaped body and an Intelligent Electronic Device (IED) attached to a circuit board of said shaped body, said IED having an associated IED memory unit; and
a Human Machine Interface (HMI) having an associated HMI memory unit and is in operative communication with the IED,
wherein at least one of said IED memory unit and said HMI memory unit are configured to store sets of data related to said switchgear panel and the equipment of said switchgear panel, and to maintain at least a functionality of the switchgear panel that corresponds to pre-equipment replacement when at least one piece of equipment including said HMI, HMI memory unit, IED, IED memory unit, and circuit breaker is replaced with an equivalent device, wherein the equivalent device is placed in communication with said IED or HMI, which is configured to compare data sets stored in the associated IED memory unit or HMI memory unit with the equivalent device, transfer at least a portion of the stored data sets to the equivalent device, and receive at least a portion of the stored data sets from the equivalent device.

12. The switchgear panel according to claim 11, wherein said circuit breaker is a first circuit breaker, and wherein at least one of said Human Machine Interface and Intelligent Electronic Device, executes a program stored respectively thereon to execute the steps of after replacing in said switchgear panel at least said first circuit breaker with a new circuit breaker having a shaped body, and positioning said Intelligent Electronic Device on board of said shaped body of the new circuit breaker, checking to determine if there are differing data between the sets of data saved on said IED memory unit and the corresponding sets of data saved on said HMI memory unit, and transferring at least part of the first and second differing data between said HMI memory unit and said IED memory unit.

13. The switchgear panel according to claim 11, wherein said Intelligent Electronic Device is a first Intelligent Electronic Device and said IED memory unit is a first IED memory unit and wherein, after replacing said first Intelligent Electronic Device that includes the first IED memory unit with a new Intelligent Electronic Device comprising a new associated memory unit and positioning said new Intelligent Electronic Device on board of said shaped body of the circuit breaker, at least one of said Human Machine Interface and said new Intelligent Electronic Device executes a program stored thereon for performing the steps of, checking to determine if there are differing data between the sets of data saved on said new IED memory unit and sets of data saved on said HMI memory unit, and transferring at least part of the first and second differing data between said first IED memory unit and said new IED memory unit.

14. The switchgear panel according to claim 11, wherein said circuit breaker is a first circuit breaker, said Intelligent Electronic Device is a first Intelligent Electronic Device, and said IED memory unit is a first IED memory unit and wherein, after replacing said first circuit breaker and said first Intelligent Electronic Device with its first IED memory unit with a new first circuit breaker having a shaped body and a new Intelligent Electronic Device which is positioned on board of said shaped body of the new circuit breaker and comprises a new IED memory unit, at least one of said Human Machine Interface and new Intelligent Electronic Device executes a program stored thereon for performing the steps of checking to determine if there are differing data between the sets of data saved on said new IED memory unit and the sets of data saved on said HMI memory unit, and transferring at least part of the first and second differing data between said HMI memory unit and said new IED memory unit.

15. The switchgear panel according to claim 11, comprising:
an additional memory unit which is removably connected to said Human Machine Interface.

16. The switchgear panel according to claim 11, wherein at least one of said Human Machine Interface and the Intelligent Electronic Device a program executes a program stored thereon for performing the steps of:
checking to determine if there are data differing between the sets of data saved on said IED memory unit and the sets of data saved on said HMI memory unit after servicing the circuit breaker provided in the switchgear panel, and allowing at least part of the first and second differing data to be transferred between said HMI memory unit and said IED memory unit.

* * * * *